US008363063B2

(12) United States Patent
Ou et al.

(10) Patent No.: US 8,363,063 B2
(45) Date of Patent: Jan. 29, 2013

(54) COLOR NOTATION SYSTEM

(75) Inventors: Li-Chen Ou, Leeds (GB); Ming Ronnier Luo, Harrogate (GB); Patrick Tak Fu Chong, Mount Arlington, NJ (US); Carl Minchew, Mountain Lakes, NJ (US)

(73) Assignee: Benjamin Moore & Co., Montvale, NJ (US)

(*) Notice: Subject to any disclaimer, the term of this patent is extended or adjusted under 35 U.S.C. 154(b) by 814 days.

(21) Appl. No.: 12/476,839

(22) Filed: Jun. 2, 2009

(65) Prior Publication Data
US 2010/0039444 A1 Feb. 18, 2010

Related U.S. Application Data

(60) Provisional application No. 61/058,032, filed on Jun. 2, 2008, provisional application No. 61/058,044, filed on Jun. 2, 2008.

(51) Int. Cl.
*G09G 5/00* (2006.01)
*G09G 5/02* (2006.01)
*H04N 5/445* (2011.01)
*G06K 9/00* (2006.01)
*G06K 9/40* (2006.01)
*G03F 3/08* (2006.01)

(52) U.S. Cl. ........ 345/589; 345/606; 345/619; 348/557; 382/162; 382/165; 382/274; 715/275; 715/700

(58) Field of Classification Search .................. 345/581, 345/589–591, 593, 606, 619, 643; 348/253–256, 348/557, 791; 358/515–520; 382/162–165, 382/254, 274; 715/275, 700
See application file for complete search history.

(56) References Cited

U.S. PATENT DOCUMENTS

| | | | | |
|---|---|---|---|---|
| 5,416,890 | A * | 5/1995 | Beretta | 345/590 |
| H0001506 | H * | 12/1995 | Beretta | 345/591 |
| 5,875,265 | A * | 2/1999 | Kasao | 382/229 |
| 7,054,794 | B2 | 5/2006 | Brunt et al. | |
| 7,193,632 | B2 | 3/2007 | Rice et al. | |
| 7,230,629 | B2 | 6/2007 | Reynolds et al. | |
| 7,330,585 | B2 | 2/2008 | Rice et al. | |
| 2003/0164968 | A1* | 9/2003 | Iida | 358/1.9 |
| 2004/0212815 | A1* | 10/2004 | Heeman et al. | 358/1.9 |
| 2006/0001677 | A1 | 1/2006 | Webb et al. | |
| 2006/0195369 | A1 | 8/2006 | Webb et al. | |
| 2008/0092457 | A1* | 4/2008 | Malone et al. | 52/105 |
| 2011/0235904 | A1* | 9/2011 | Mojsilovic | 382/164 |

OTHER PUBLICATIONS

S. Sueeprasan et al. "An Investigation of Colour Emotions Using Two-Colour Combinations". AIC Colour 05-10th Congress of the International Colour Association. 2005; pp. 271-274.
Ferenc Szabo et al. "Experimental Modeling of Colour Harmony". Color Research and Application. 2009; pp. 34-44. Wiley Periodicals, Inc. Veszprem, Hungary.
Brochure—Benjamin Moore's Video Color Planner. 1990.
Ronnier Luo. Presentation Slides—Technology for Colour Communication and Design. Ind. Color Challenge, ISCC/AATCC, Charlotte. Feb. 23, 2007.
O. Da Pos and V. Valenti. "Warm and Cold Colours". Proceedings of AIC 2007—Color Science for Industry. pp. 41-44.

(Continued)

*Primary Examiner* — Wesner Sajous
(74) *Attorney, Agent, or Firm* — The H. T. Than Law Group

(57) ABSTRACT

According to one example embodiment described herein is a method of notating a color that includes determining, using predetermined mathematical equations and in dependence on numerical color attributes that identify a color, a plurality of numerical color emotion values each representative of a different human emotional response to the color; and assigning an identifying notation to the color, the identifying notation comprising a color emotion notation that includes the color emotion values.

27 Claims, 5 Drawing Sheets

OTHER PUBLICATIONS

Li-Chen Ou et al., "A Study of Colour Emotion and Colour Preference. Part I: Colour Emotions for Single Colours". Color Research and Application. Jun. 2004; pp. 232-240, vol. 29, No. 3. United Kingdom.

Li-Chen Ou et al., A Study of Colour Emotion and Colour Preference. Part II: Colour Emotions for Two-Colour Combinations. Color Research and Application. Aug. 2004; pp. 292-298, vol. 29, No. 4. United Kingdom.

Li-Chen Ou et al., "A Study of Colour Emotion and Colour Preference. Part III: Colour Preference Modeling". Color Research and Application. Oct. 2004; pp. 381-389, vol. 29, No. 5. United Kingdom.

Li-Chen Ou and M. Ronnier Luo. "A Color Harmony Model for Two-Colour Combinations". Color Research and Application. Jun. 2006; pp. 191-204, vol. 31, No. 3. United Kingdom.

Tetsuya Sato et al. "Numerical Expression of Colour Emotion and Its Application". Proceedings of AIC 2003 Bangkok: Color Communication and Management.

Ming-Chuen Chuang and Li-Chen Ou. "Influence of a Holistic Color Interval on Color Harmony". Color Research and Application. Feb. 2001; pp. 29-39, vol. 26, No. 1. Republic of China.

Ferenc Szabo et al. "Visual Experiments on Colour Harmony: A Formula and a Rendering Index". CIE 26th Session. Beijing 2007.

Nathan Moroney et al. "The CIECAM02 Color Appearance Model". IS&T/SID Tenth Color Imaging Conference. Scottsdale, Arizona, Nov. 2005.

Laszlo Neumann et al. "Computational Color Harmony Based on Coloroid System". Jun. 2005. Institute of Computer Graphics and Algorithms. Vienna Austria.

Tetsuya Sato et al. "Development of Sportswear Design Assisted System Based on Numerical Expression of Colour Emotion". 2000; pp. 27-42, vol. 21. Japan, Written in year 2000.

Tetsuya Sato et al. "Development of Sportswear Design Assisted System Based on Numerical Expression of Colour Emotion". 2000; pp. 27-42, vol. 21. Japan. [English Translation], year 2000.

Parry Moon and Domina Eberle Spencer. "Geometric Formulation of Classical Color Harmony". Journal of the Optical Society of America. Jan. 1944; pp. 46-59, vol. 34, No. 1. Massachusetts.

Parry Moon and Domina Eberle Spencer. "Aesthetic Measure Applied to Color Harmony". Journal of the Optical Society of America. Apr. 1944; pp. 234-242, vol. 34, No. 4. Massachusetts.

Parry Moon and Domina Eberle Spencer. "Area in Color Harmony". Journal of the Optical Society of America. Feb. 1944; pp. 93-103, vol. 34, No. 2. Massachusetts.

Xingmei Wang et al. "Influence of Area Proportion on Colour Harmony". Apr. 24-26, 2007. International Conference on Colour Harmony. Budapest, Hungary.

Helen Skelton and James H. Nobbs. "Predicting a Description of Subjective COLOUR with a Neutral Network". Proceedings of the International Conference and Exhibition held in Harrogate, England. Apr. 1998; pp. 107-123, vol. III- Colour Physics.

Tetsuya Sato et al. "Japanese and UK Visual Scales". Proceedings of Colour Science. 1998; pp. 100-103. Harrogate, United Kingdom.

* cited by examiner

Unique notation with intuitive meaning that promotes business alliance

| WLE COLOR NOTATION SYSTEM | | | |
|---|---|---|---|
| Color Name | Original Coding | WLE Notation | Complete Notation |
| DELANO WATERS | 766 | 184 | 2054-58.4+(184) |
| BARELY TEAL | 2048-70 | 284 | 2048-70+(284) |
| QUARTZ STONE | 597 | 384 | 2041-61.3+(384) |
| LEISURE GREEN | 2035-60 | 484 | 2035-60+(484) |
| GRASSY MEADOWS | 570 | 584 | 2034-55.4+(584) |
| NOTTINGHAM GREEN | 569 | 584 | 2034-60.2+(584) |
| LIGHT PISTACHIO | 2034-60 | 584 | 2034-60+(584) |
| CUCUMBER SALAD | 562 | 584 | 2034-55.7+(584) |
| PARKSIDE DUNES | 568 | 584 | 2034-64.6+(584) |
| PISTACHIO | 561 | 584 | 2034-57.9+(584) |
| DAIQUIRI ICE | 2034-70 | 584 | 2034-70+(584) |
| HONEYDEW | 549 | 584 | 2032-49.3+(584) |
| CITRA LIME | 2032-60 | 584 | 3032-60+(584) |
| PASTEL GREEN | 548 | 584 | 2032-53.0+(584) |
| GREEN COVE SPRINGS | 421 | 684 | 2029-63.1+(684) |
| POLAR LIGHTS | 400 | 784 | 2028-58.6+(784) |
| SQUISH-SQUASH | 311 | 884 | 2019-49.1+(884) |
| SOFT SALMON | 096 | 984 | 2166-50.4+(984) |

FIG. 5

COLOR NOTATION SYSTEM

This application claims the benefit of U.S. provisional patent application Ser. Nos. 61/058,032 filed Jun. 2, 2008 and 61/058,044 filed Jun. 2, 2008, the contents of which are incorporated herein by reference.

BACKGROUND

The present description relates to a color notation system for identifying colors and the application of color notation systems in color display and selection systems.

Color identification systems are typically used in various sectors, including for example the paint industry, to uniquely identify colors. There are a variety of categories of color notation systems currently in use. For example, in one category of color notation system, color notation is based on a serial number with or without alpha characters as prefix or postfix. An example of a serial number based system includes the RAL German Institute for Quality Assurance and Certification e.V. notation system which includes a four-digit number in combination with the letters "RAL" (e.g. RAL 1028). The first digit is a system code number (1: yellow, 2: orange, 3: red, 4: violet, 5: blue, 6: green, 7: grey, 8: brown and 9: white and black shades). The remaining three digits are chosen sequentially. The name of a color shade (e.g. melon yellow for RAL 1028) is an auxiliary designation.

In another category of color notation system, color notation is based on a color order system. An example of such a system is the Munsell color-order system that is accepted by many industries including the art, design, color photography, television, printing, paint, textiles and plastics industries. It is recognized as a standard system of color specification by numerous standards bodies (for example, as standard Z138.2 of the American National Standards Institute). A Munsell color notation is composed of 3 components: Munsell Hue, Munsell Value and Munsell Chroma.

Yet another category of color notation system is color notation based on the CIELAB color system. An example of this is the RAL German Institute for Quality Assurance and Certification e. V. "The RAL DESIGN System", which uses an initial three digits to identify the hue H, a following pair of digits to define the lightness L, and a second pair of digits to identify a chroma C. For example, the RAL DESIGN System color 270 30 20 is a dark blue with a hue H of 270, a lightness L of 30 and a chroma C of 20.

One issue with existing color notation systems is their inability to enable an individual to imagine or fully appreciate what kind of color the color code really represents.

SUMMARY

According to one example embodiment described herein is a method of notating a color that includes determining, using predetermined mathematical equations and in dependence on numerical color attributes that identify a color, a plurality of numerical color emotion values each representative of a different human emotional response to the color; and assigning an identifying notation to the color, the identifying notation comprising a color emotion notation that includes the color emotion values.

According to another example embodiment described herein is a color sample that includes a substrate having a display surface with a color and an identifying notation for the color being viewable on the display surface, the identifying notation including a color emotion notation that includes a plurality of color emotion values, wherein each of the color emotion values is representative of a different human emotional response to the color and derived from a different predetermined mathematical equation in dependence on numerical color attributes that identify the color.

According to another example embodiment is a computer implemented method of presenting color samples, including receiving an input through an input device requesting that at least one color be displayed, and displaying on an electronic display a visual representation of the color and an identifying notation for the color, the identifying notation including a color emotion notation that includes a plurality of color emotion values, wherein each of the color emotion values is representative of a different human emotional response to the color and derived from a different predetermined mathematical equation in dependence on numerical color attributes that define the color.

A method for estimating the color attributes of color, comprising retrieving a color emotion notation for a color, the color emotion notation including a plurality of color emotion values each being representative of a respective human emotional response to the color, each color emotion value having been calculated using a predetermined mathematical equation in dependence on numerical color attributes that define the color; and estimating the numerical color attributes that define the color in dependence on the color emotion notation.

BRIEF DESCRIPTION OF THE DRAWINGS

Embodiments will now be described, by way of example only, with reference to the attached Figures, wherein:

FIG. 5 illustrates a user interface illustrating colors having similar color notations.

Like reference numerals are used throughout the Figures to denote similar elements and features.

DETAILED DESCRIPTION

Figure 1:
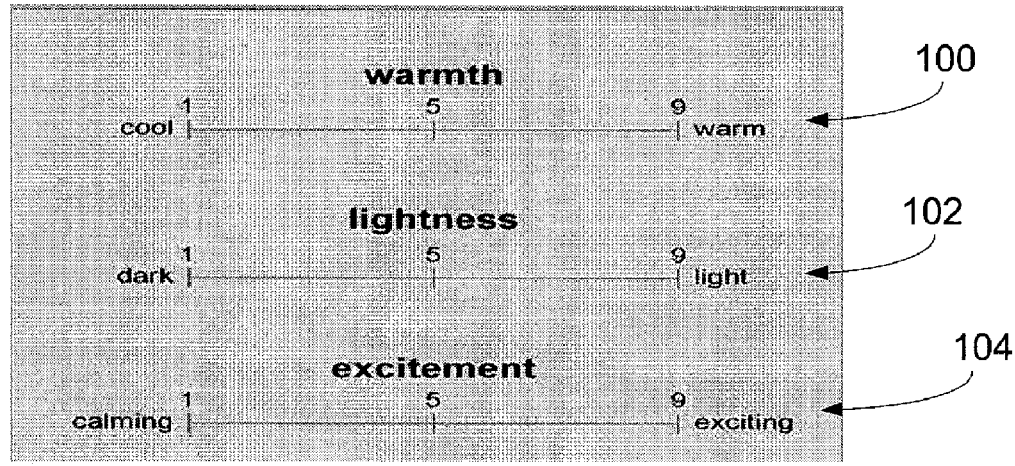
FIG. 1 is a diagram illustrating three color emotion scales used in a color notation system according to an example embodiment of the invention.

Example embodiments are described herein for a color notation system that can convey information to an individual that goes beyond a mere serial number, or a numeric indication of a color attribute such as hue or lightness or choma. In particular, example embodiments describe a color notation system that conveys a representation of a human emotional response to the color that is represented by the notation system. In particular, a set of numeric values that represent emotional response attributes are associated with colors. These numeric values are determined in dependence on qualitative mathematical models derived from psychometric data obtained from actual test subjects based on the test subjects' psychophysical reactions to colors. For example, in one embodiment, mathematical models that represent the human emotional perceptions of "warmth" (W), "lightness" (L), and "excitement" (E) are used to provide numeric representation of a color's emotional appeal. In at least some example embodiments, the resulting color emotion notation system is intuitive and easy to understand for the layperson with little training, in contrast to existing color systems such as Munsell, CIELAB and RAL DESIGN that require a greater degree of training to comprehend.

In order to provide some background for the color emotion models used herein, reference is made to following four documents which describe examples of color emotion models and how such models are derived. The following references are incorporated herein by reference:

Ou, L., Luo, M. R., Woodcock, A., and Wright, A., "A study of colour emotion and colour preference, Part I: colour emotions for single colours", Color Research and Application, Volume 29, number 3, pages 232-240, June 2004.

Ou, L., Luo, M. R., Woodcock, A., and Wright, A., "A study of colour emotion and colour preference, Part II: colour emotions for two-colour combinations", Color Research and Application, Volume 29, Number 4, pages 292-298, August 2004.

Ou, L., Luo, M. R., Woodcock, A., and Wright, A., "A study of colour emotion and colour preference, Part III: colour preference modeling", Color Research and Application, Volume 29, Number 5, Pages 381-389, October 2004.

Ou, L., Luo, M. R., "A colour harmony model for two-colour combinations", Color Research and Application, Volume 31, Number 3, pages 191-204, June 2006.

Reference is also made to the following documents, the contents of which are incorporated herein by reference:

N. Moroney, M. Fairchild, Hunt, R. Luo and T. Newman, "The CIECAM02 Color Appearance Model", IS&T/SID Tenth Color Imaging Conference, Nov. 12, 2002, ISBN:0-89208-241-0.

International Patent Application No. PCT/US2008/069664 filed Jul. 10, 2008, claiming priority to U.S. provisional patent application No. 60/929,744, filed Jul. 11, 2007.

In example embodiments, mathematical models for color emotions were derived based on the results of one or more psychophysical experiments that were carried out using a number of color patches presented to test subjects that included professional designers and laypersons. Each test subject assessed the degree of color emotion for each color patch using a 10-category scale for each of the following color emotion scales after being advised of the following dictionary meanings associated with each of the scales:

Cool-warm:
warm: of or at a fairly or comfortably high temperature
cool: of or at a fairly low temperature
Dark-light:
light: having a considerable or sufficient amount of natural light
dark: with little or no light
Calming-exciting:
exciting: causing great enthusiasm and eagerness
calming: making (someone) tranquil and quiet It was found from the assessments provided by the test participants that the CIELAB attributes for colors were sufficiently correlated with test participant's perception of the emotional attributes of the test colors that mathematical models could be derived to predict human emotional response to a color based on the CIELAB attributes for the color. In this regard, the following human psychophysical perception models were developed based on actual test response data and are used in example embodiments described herein to determine color emotion scores for each of the three scales noted above:

$$\text{Warmth} = W = 2\cos(h_{ab} - 45°) \quad \text{(cool-warm scale)} \quad \text{Equation (1)}$$

$$\text{Lightness} = L = 0.04(L^* - 50) \quad \text{(dark-light scale)} \quad \text{Equation (2)}$$

$$\text{Excitement} = \quad \text{Equation (3)}$$

$$E = -1.13 + 0.02\left[(L^* - 40)^2 + \left(\frac{a^*}{0.37}\right)^2 + \left(\frac{b^*}{0.6}\right)^2\right]^{\frac{1}{2}}$$

(calming-exciting scale)

where $h_{ab}$ is CIELAB hue angle; $L^*$, $a^*$ and $b^*$ are CIELAB co-ordinates for lightness, reddishness-greenishness and yellowishness-bluishness, respectively under CIE illuminant D65.

Thus, using the above equations, the CIELAB attributes for a particular color can be used to calculate color emotion scores that are predictive of how a typical observer would perceive a color on the cool-warm (W), dark-light (L) and calming-exciting (E) color emotion scales.

The color emotion scores determined by each of the above equations are real numbers. In an example embodiment, the real color emotion values generated by the above equations are each converted into discrete integer numbers ranging from 1 to 9, using the following equations:

$$\hat{W} = \text{round}(5 + 2W) \quad \text{Equation (4)}$$

$$\hat{L} = \text{round}(5 + 2L) \quad \text{Equation (5)}$$

$$\hat{E} = \text{round}\left[1 + \frac{8(E + 1.1)}{3.5}\right] \quad \text{Equation (6)}$$

where round(x) represents a function that rounds a number x down to the nearest integer.

Using the results of equations (4), (5) and (6), a three digit color notation can be assigned to a color based on the color's defining CIELAB coordinates and then presented to a user with the color sample. The three digit color notation represents color emotion scores for three color emotion scales (the cool-warm (W), dark-light (L) and calming-exciting (E) color emotion scales, or Warmth-Lightness-Excitement ("WLE") scales for short).

FIG. 1 illustrates a quantitative scale for each of the 3 scales, namely the cool-warm scale 100, dark-light scale 102 and calming-exciting scale 104, with each scale ranging from 1 to 9, with 1 representing the highest level of coolness, darkness, and calming, respectively on each of the scales, and 9 being the highest level of warmth, lightness, and exciting, respectively on each of the scales. A scale value of 5 represents "neutral" on each scale.

Accordingly, using equations 1-6 noted above, a 3 digit notation that represents scores for 3 different color emotion scales can be assigned to each color in a color library based on the CIELAB values for those colors. By way of example, the following Table 1 shows XYZ color data for a series of sample colors, along W, L and E values calculated for the sample colors based on equations 1-3 noted above, along with a corresponding three digit WLE color notation based on equations 4-6 noted above. In the example shown in Table 1 below, the XYZ color coordinate data has been converted to CIELAB data using known conversion techniques, which has then been used in equations 1-3 to generate the W, L and E values shown in the $5^{th}$, $6^{th}$ and $7^{th}$ columns, which data has then been converted to integer values using equations 4-6 to provide the WLE notation shown in the $8^{th}$ column.

TABLE 1

Color Emotion Notation for sample colors

|  | X | Y | Z | W | L | E | WLE NOTATION |
|---|---|---|---|---|---|---|---|
| Color 1 | 11.4 | 10.7 | 7.4 | 1.98 | −0.44 | −0.46 | (942) |
| Color 2 | 60.4 | 66.3 | 83.9 | −1.94 | 1.41 | −0.12 | (183) |
| Color 3 | 18.9 | 12.4 | 5.2 | 1.95 | −0.33 | 1.34 | (947) |
| Color 4 | 16.5 | 21.4 | 20.0 | −0.99 | 0.14 | −0.01 | (353) |

As can be seen from the above table 1, Color 2, which is a blue color, has a WLE notation of (183), which indicates that it scores the maximum "cool" value (1) on the cool-warm scale, it scores quite high (8) on the dark-light scale and it scores on the calm side (3) on the calming-exciting scale. As the equations used to determine the WLE notation have been modeled on actual human emotional responses to colors, the WLE notation is a prediction of what the actual emotional reaction of a cross-section of people would be to the subject color. Thus, by looking at the WLE notation value, a user is provided with information representative of how a particular color will be perceived by people in terms of the emotional pairings of cool-warm, dark-light and calming exciting. Such information can be useful to consumers and designers when picking colors for paints, stains and other architectural coatings, textiles, flooring, broadloom, drapes, appliances, furniture, countertops, clothing, cars, etc.

In at least some example embodiments, the color emotion color notation system can be combined with other color notation systems including for example the serial number based notation systems, color order notation systems or CIELAB color notation systems noted above.

By way of example, the existing Benjamin Moore™ Color Preview™ collection of colors includes a red color that is identified using the unique identifier "CP 2000-10". This particular red color has CIELAB attributes of: L*=43.9; a*=56.6; and b*=36.4, resulting in a color emotion notation of (958), which indicates that this particular red would be perceived by a typical viewer as extremely warm, at a mid-level of lightness and is a very exciting color. Combining the conventional Benjamin Moore™ identifier for the color with the color emotion notation provides the following notation for the color: "CP 2000-10-(958)". In an example embodiment, the combined notation is provided with a color sample to a user so that the user has a unique identification code for the color as well as the color emotion notation.

Figure 2:
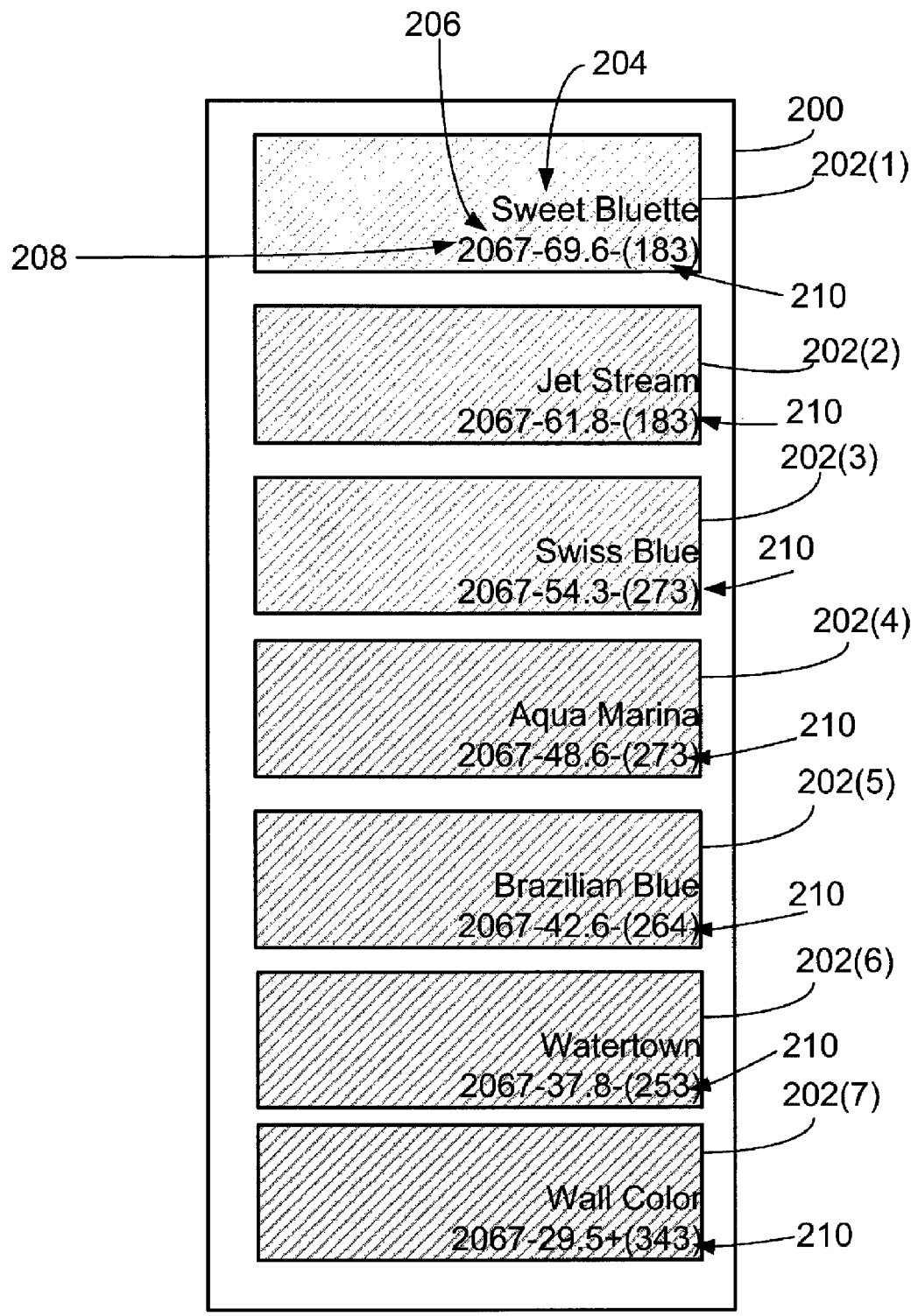
FIG. 2 is a front view illustrating multi-color sample chip incorporating a color emotion notation system according to an example embodiment.

Color samples together with the color emotion notation can be presented to users in a wide variety of mediums and environments. For example, architectural coating samples such as paint color samples are often presented to consumers in a retail environment in the form of hard samples such as multi-sample color chips, which are typically rectangular pieces of thick paper or cardboard that have a plurality of different paint colors on them, or single sample swatches which are pieces of thick cardboard or paper that have a single color sample applied to them. FIG. 2 illustrates a representation of a conventional rectangular paper multi-sample color strip or chip 200 that has been modified to include the emotional scale color notation according to an example embodiment. The color chip 200 will typically be one of many color chips that are displayed in a sample rack in a retail paint store, and may be of a convenient size so that customer can take the paint chip home if desired. The color chip 200 displays seven different paint colors 202(1)-202(7) (each referred to generally herein by reference 202(i)). Each of the paint colors 202(i) on the chip has printed on it a color name 204 as well as an identifying notation 206. In the illustrated example, the notation 206 includes two portions, namely a multi-digit unique numeric identifier 108 followed by a 3 digit color emotion WLE notation 210 that provides scores on a scale of 1-9 for each of the cool-warm, dark-light and calming-exciting emotional pairing scales.

Accordingly, the color chip 200 provides a user with an indication of the typical emotional responses that the subject colors presented on the chip would likely evoke in viewers on the cool-warm, dark-light and calming-exciting emotional scales. In the illustrated example, based on the color emotion notations 210 the user will be able to appreciate that the displayed color samples have increasing relative warmth, decreasing lightness, and a relatively steady calmness, going from the top of the chip to the bottom. It will be noted from FIG. 2 that color samples 202(3) and 202(4) each have an identical color emotion notation (273), indicating that these two colors have similar WLE color emotion qualities.

Figure 3:
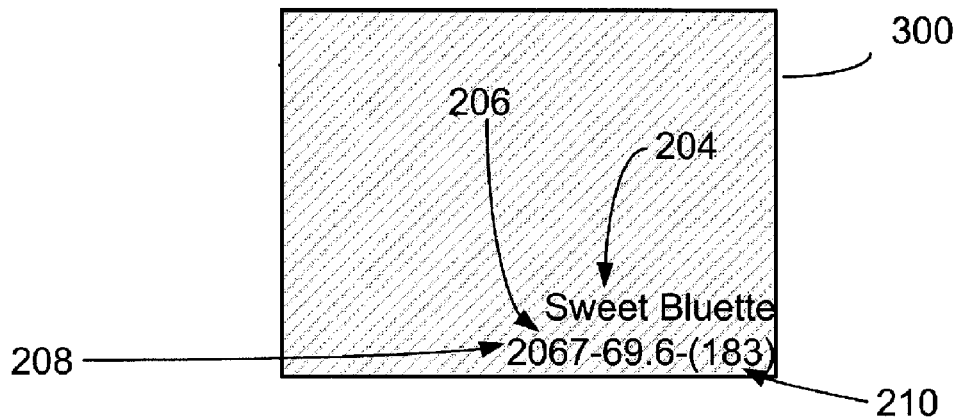
FIG. 3 is a front view illustrating single sample color swatch incorporating a color emotion notation system according to an example embodiment.

In addition to a physical multi-color sample paint chip 200 used in a retail location color sample display, the color emotion notation 210 can also be applied to other physical or hard color sample presentation systems. For example, FIG. 3 shows a single color swatch 300 that consists of a piece of thick paper having a surface that is the sample color. As with each of the colors 202(i) shown on the multi-sample chip, the color swatch 300 has printed on it a color name 204 as well as an identifying notation 206 that overlies the color and includes a multi-digit unique numeric identifier 108 followed by a 3 digit color emotion WLE notation 210.

Although the swatch 300 and color chip 200 have been described in the context of paint colors carried on a paper substrate, the swatch and color chip or other similar types of color sample display systems could be used to display colors with associated color emotion notations on substrates other than paper, including for example substrates that include wall paper, fabric, flooring material, wall tile, ceiling tile, plastic, metal, composite material, or cardboard, among other things. For example, the swatch 300 could be a textile swatch dyed in a sample color with the color notation 210 printed on the textile swatch, or put on a label that in turn is fastened to the textile swatch, or put on a substrate to which the textile swatch is fastened.

The above examples of how hard or physical color samples can be displayed with an associated color emotion notation system are provided to illustrate the color emotion notation system described herein. It will be appreciated that the color emotion notation system could be applied to color samples displayed in a number of configurations.

Figure 4:
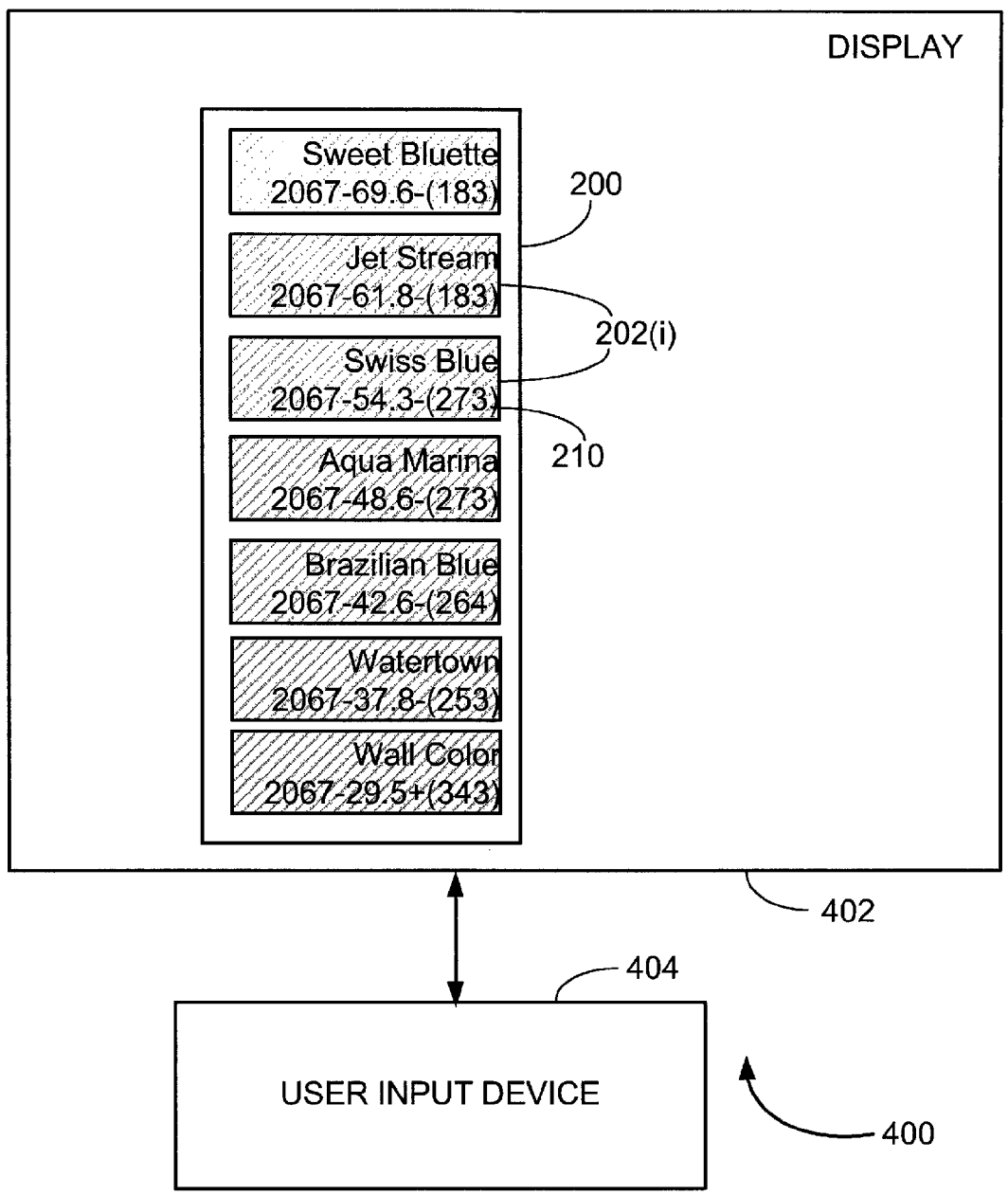
FIG. 4 is a block diagram illustrating an electronic display system for presenting a virtual representation of a multi-color sample chip incorporating a color emotion notation system according to an example embodiment.

Additionally, although physical display systems have been discussed above, the color emotion notation system can also be used to present soft samples in electronic or virtual display systems. By way of example, FIG. 4 illustrates an electronic display device 400, which could for example be a personal computer, a handheld computer, a smart phone, or other processor enabled device, which includes a display device such as a display screen 402 and a user input device 404 that may include one or more of a keyboard, keypad, navigational input, microphone, touch screen, accelerometer, or mouse, by way of example. Displayed on the display screen 402 is a soft sample in the form of a virtual rendition of the color chip 200, including the color emotion notation 210 for each of the displayed colors 202(i). Similarly, color swatch 300 could also be displayed as a virtual or soft sample on electronic display device 400. The program and data that causes the display device 400 to display colors with color emotion notation information can be stored locally on the device 400, or can be stored remotely and accessed by the device 400 through a network such as the Internet for example. It will be appreciated that the example display interface shown in FIG. 4 represents just one of many ways in which a color emotion notation can be presented in association with a sample color to a user.

The color emotion notation system described herein can be used in any physical or virtual color display system where people are presented with color choices, including for example colors for: paints and stains and other architectural coatings, wall coverings, textiles, flooring, broadloom, drapes, appliances, furniture, countertops, clothing, and cars, among other things.

Furthermore, the color emotion notations for colors that will be applied to different surfaces and products at a location can be compared to give the user a sense of color compatibility and promote color integrity decisions across surfaces and products that will be used at the location. For example, in the context of a kitchen the color choices for appliances, flooring materials, counter top materials, backsplash materials, curtain fabrics and paints available from different suppliers can each be provided with appropriate WLE color emotion notations, aiding users to consistently pick "exciting" colors or "warm" colors or a desired mix of complimentary colors from the color choices available from the different suppliers.

By inter-comparing WLE notations of colors from different sources/substrates (e.g. paint, textile, plastic, wood), the WLE notations provide an indication of color compatibility in terms of Warm/Cool, Light/Dark, Exciting/Calm dimensions that can be intuitively used to promote color integrity decision across products, brands and businesses. FIG. 5 shows an example of an electronic user interface illustrating examples of the WLE notation as well as its association with an existing Benjamin Moore Color Preview notation. The colors with the same WLE notation of 584 appear very similar in terms of W/L/E color quality. For those colors with the 2nd and 3rd digits in the WLE notation constant but with the 1st digit changes from 1 to 9, one can appreciate that the colors are changing from a cool to warm appearance while the lightness and the excitement/calmness color quality remains similar. Thus, colors with similar level of Warm/Cool, Light/Dark, and Exciting/Calm notation may be used side by side to assure compatibility in terms of WLE. End users, color consultants, and designers can benefit by referencing the WLE color notation system to ensure WLE compatibility for paint color selection or for cross-product color selection (e.g. paint, furniture and textile colors). Different product suppliers (for example, paint suppliers, furniture and house ware suppliers, and appliance suppliers) can use the same WLE color notation system for their products, and share this WLE color notation for use by their customers on-line. For example, product information available on electronic catalogues made available through the suppliers' respective web-pages could include the WLE color notation for different available colors. Such data can be used to track inventory of cross-industry products with respect to WLE compatibility. Such information can be released on a real-time basis to customers for interior or exterior color design purposes.

The WLE color notation can also be used to track seasonal color trends of fashion colors for different industries. For example, one can measure the high fashion colors of menswear and ladies-wear for various seasons and record them in WLE color emotion notation or other color emotion notations as a function of time. The tracking of such color emotion information may be used to understand the historical color emotion color trend but also in predicting the future color emotion trend. In addition, one can link this information to sales forecasting in terms of WLE color notation.

Figure 6:
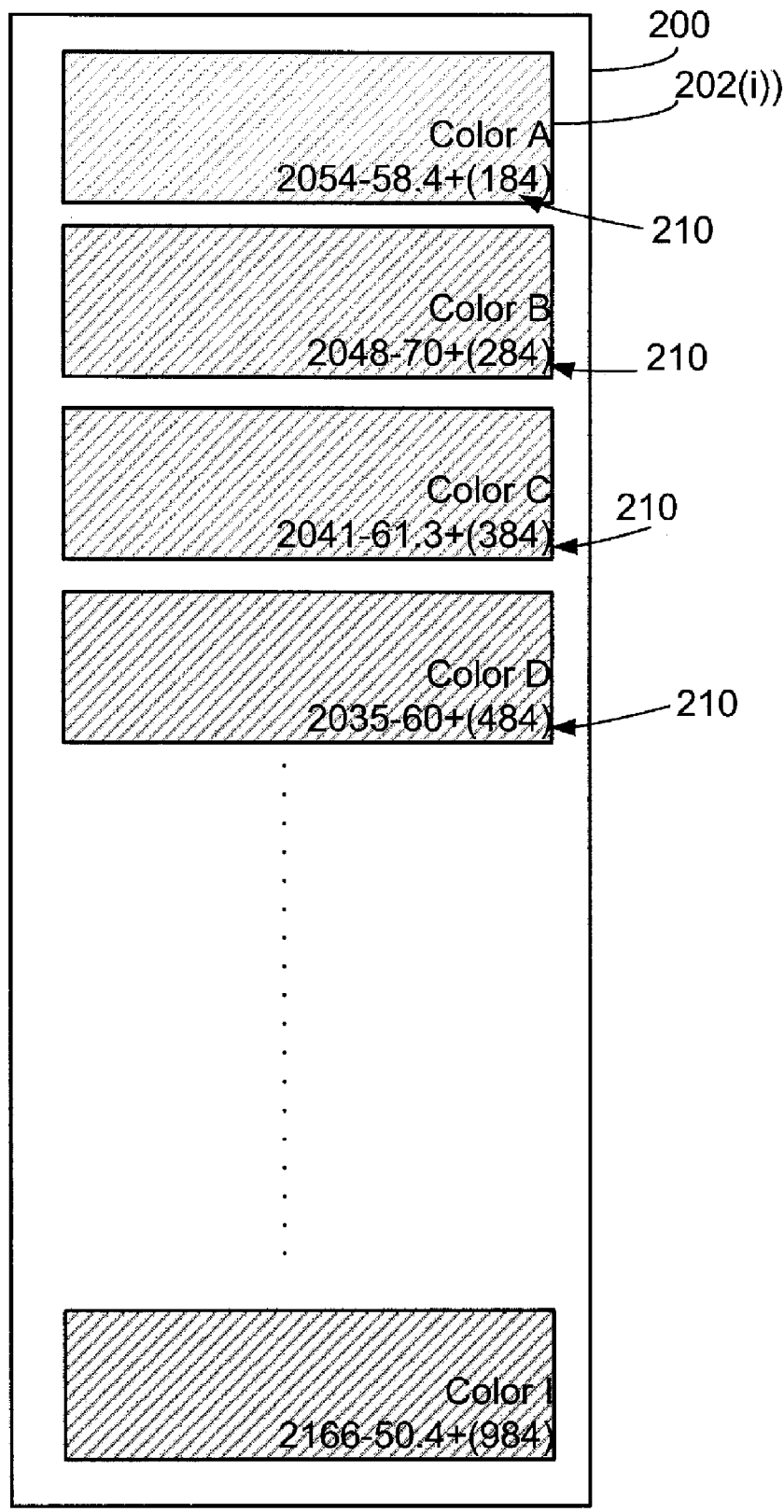
FIG. 6 is a front view illustrating multi-color sample chip incorporating a color emotion notation system according to an example embodiment.

In one example embodiment, collections of colors are organized for presentation to users in dependence on color emotional notation values. For example, colors or sub-groups of colors in a color library can be sorted and presented to a user according to where they score on the cool-warm scale (W) or the dark-light scale (L) or the calming-exciting scale (E). In this regard, FIG. 5 illustrates a color chip 200 that has a selection of color samples 202(i) that have color emotion notations 210 with the same scores on the dark-light (L) scale and the calming-exciting scale (E), but which progressively get warmer on the cool-warm (W) scale going from top to bottom. In the color display of FIG. 6, the colors go from cool to warm while the lightness/excitement color emotion qualities remains similar. The set of color samples 202 represented by color chip 200 could be assembled and displayed on display screen 402 in reply to a user request for colors having a set L and E scores, but with progressive W scores, for example. Alternatively, the color chip 200 could be a physical sample. It will be appreciated that FIG. 5 shows just one example of how a color emotion notation can be used to sort, select or organize color samples.

Although the color emotion values have each been converted to a single digit per color emotion by using equations (4), (5) and (6), in different applications it may be desirable to provide increased resolution for the color emotion notation system by increasing the number of digits used for color emotion scale representation—for example 2 digits could be used on a 1-99 scale for each color emotion representation as opposed to 1 digit on a 1-9 scale, or a 3 digit color emotion value could be used on a 1-999 scale. Instead of integer scales, one or two or more decimal places could be used in the scale—for example one decimal place (X.X) or two decimal places (X.XX) could be used on a 1-9 scale. Thus, the precision or resolution of the color emotion notation can be increased by increasing the number of digits used for each color emotion value. In some situations, for example typical consumer use, a single digit resolution may be sufficient, but in some applications, the increased information provided by additional digits may be desired.

In one example embodiment, the real W, L and E values given by equations (1), (2) and (3) can be used to estimate or derive CIELAB hue ($h_{ab}$), a* and b* coordinates for a particular color sample using the following equations:

$$h_{ab} = 45° \pm \cos^{-1}\left(\frac{W}{2}\right) \quad \text{Equation (7)}$$

$$L^* = 2.5L + 50 \quad \text{Equation (8)}$$

$$a^* = \text{sign}[\cos(h_{ab})] \times (0.37 \times 0.6)\sqrt{\frac{\left|\left(\frac{E+1.13}{0.02}\right)^2 - (L^*-40)^2\right|}{0.6^2 + [0.37\tan(h_{ab})]^2}} \quad \text{Equation (9)}$$

$$b^* = a^* \tan(h_{ab}) \quad \text{Equation (10)}$$

where sign[cos($h_{ab}$)] in Equation (9) represents the sign of the value for cos($h_{ab}$), i.e. 1 if the value is positive, 0 if zero, and −1 if negative.

Note that in Equation (7) the same W value can result in two solutions for $h_{ab}$, one within the range from 45° to 225° and the other beyond this range. Thus, further information beyond just the real WLE values is required to derive the CIELAB attributes for at least some seta of real WLE values. This additional information may be provided example by a symbol, such as for example the plus sign (i.e. +, to indicate that the hue angle is within the range from 45° to 225°) or minus sign (i.e. −, to indicate that the hue angle is beyond the range). Thus, in one example embodiments the color emotion notation can take the form of numbers that represent each of the real W,L and E values of equations (1) to (3), together with a symbol. From that information, the CIELAB coordinates for the associated color can be determined. Additionally, as noted above in some example embodiments, the color emotion values used in the color emotion notation can each have more than one digit, thereby providing greater resolution. The accuracy of the calculated CIELAB parameters using equations (7), (8) and (9) is subject to the number of digits the color emotion values are rounded to when using equations (4), (5) and (6). The greater the number of digits in each of the W, L and E values that are input into equations (7), (8) and (9), the closer the match of the reverse engineered CIELAB attributes will be to the true CIELAB attributes of the color represented by the WLE color emotion notation.

By way of example, TABLE 2 below illustrates the accuracy of calculating the CIELAB attributes with different numbers of digits included in the color emotion values. In the example of TABLE 2, the following calculation steps were carried out for each of 10 colors with known CIELAB values.

a) Equations (1), (2) and (3) were used to calculate the W, L and E color emotion values from known CIELAB values.

b) These W, L and E color emotion values were each rounded to a 1 digit integer format, using equations (4), (5) and (6), with each value ranging from a minimum of 1 to a maximum of 9—e.g. 9, 8, and 4.

c) The W, L and E color emotion values were also each transformed to a 2 digit with one decimal format with each value ranging from a minimum of 1.0 to a maximum of 9.0—e.g. 8.9, 8 and 3.8.

d) The W, L and E color emotion values were also each transformed to a 3 digit with two decimal format with each value ranging from a minimum of 1.00 to a maximum of 9.00—e.g. 8.95, 8.05 and 3.83.

e) The transformed WLE color emotion values calculated in steps (b), (c) and (d) were back calculated to CIELAB values using equations (8), (9), (10) and (11).

f) For each color, the calculated CIELAB values in step (e) were compared to the corresponding original CIELAB values to determine a CIELAB color difference value $DE^*_{ab}$. The bigger the difference value, the bigger the impact of the WLE format on the "Backward" calculation accuracy.

As can be seen from TABLE 2, the 3 digit with 2 decimal format provided greater accuracy than the lower resolution W,L and E color emotion values when reverse engineering a color's CIELAB values.

The hidden color information behind the WLE notation can be extensive once the CIELAB parameters such as the CIE $L^*$, $a^*$, $b^*$ values are determined from the WLE notation. This is because these parameters enable the computation of numerous color related parameters for value added applications. Examples of useful color parameters to support color decision are as follow (the documents listed below are herein incorporated by reference):

Color Harmony—see International Patent Application No. PCT/US2008/069823 filed Jul. 11, 2008 claiming priority to Provisional Patent Application No. 60/929,743 for "Color Selection System" filed Jul. 11, 2007.

Whiteness and Yellowness Quality—see ASTM E313-98

Blackness Quality—see S. Westland, T. L. V. Cheung, O. R. Lozman "A metric for predicting perceptual blackness"; proceeding of $14^{th}$ Color & Imaging Conference (Nov. 6-10, 2006), Scottsdale, Ariz.

Light Reflectance Value—see ASTM C609-07 Standard Test Method for Measurement of Light Reflectance Value and Small Color Differences Between Pieces of Ceramic Tile Although the WLE color emotion notation described above is based on the color emotion pairings cool-warm, dark-light and calming-exciting, as set out in the papers from Ou, L. et al. identified above, color emotion models can be also developed for other emotional pairings based on response data from test subjects. In some example embodiments, the color emotion notation for a color can include scores for different or additional emotional-pairing scales than the WLE notation described above, and may include color emotion scores for more or less than three color emotion pairings. By way of example, color emotion models predictive of human responses have been derived for the following additional emotion pairings, among others: inviting-uninviting (inviting: offering the promise of an attractive or enjoyable experience; uninviting: unappealing; unattractive); clean-dirty (clean: free from dirt, marks, or stains; dirty: covered or marked with an unclean substance); happy-depressing (happy: feeling or showing pleasure or contentment; depressing: causing or resulting in a feeling of miserable dejection); or fun-serious (fun: amusing, entertaining, or enjoyable; serious: acting or speaking sincerely and in earnest, rather than in a joking or half-hearted manner) as follows:

TABLE 2

BACKWARDS CALCULATION OF CEILAB VALUES FROM WLE COLOR EMOTION NOTATION

| | ORIGINAL CIELAB VALUES | | | 1 DIGIT INTEGER | | | | 2 DIGIT WITH 1 DECIMAL | | | | 3 DIGIT WITH 2 DECIMAL | | | |
|---|---|---|---|---|---|---|---|---|---|---|---|---|---|---|---|
| Color | L* | a* | b* | W' | L' | E' | $DE^*_{ab}$ | W' | L' | E' | $DE^*_{ab}$ | W' | L' | E' | $DE^*_{ab}$ |
| 1 | 88.1 | 13.9 | 10.1 | 9 | 8 | 4 | 5.0 | 8.9 | 8 | 3.8 | 1.3 | 8.95 | 8.05 | 3.83 | 0.1 |
| 2 | 82.7 | 21.1 | 13.6 | 9 | 8 | 4 | 7.9 | 8.9 | 7.6 | 4.3 | 0.6 | 8.91 | 7.62 | 4.34 | 0.1 |
| 3 | 77.9 | 26.1 | 16.8 | 9 | 7 | 5 | 9.4 | 8.9 | 7.2 | 4.8 | 0.5 | 8.91 | 7.23 | 4.81 | 0.0 |
| 4 | 70.9 | 35.2 | 23.1 | 9 | 7 | 6 | 11.0 | 8.9 | 6.7 | 5.8 | 1.1 | 8.92 | 6.67 | 5.83 | 0.1 |
| 5 | 64.8 | 41.9 | 29.3 | 9 | 6 | 7 | 12.1 | 8.9 | 6.2 | 6.7 | 2.6 | 8.94 | 6.19 | 6.69 | 0.1 |
| 6 | 60.0 | 45.8 | 32.2 | 9 | 6 | 7 | 10.4 | 8.9 | 5.8 | 7.2 | 3.0 | 8.94 | 5.8 | 7.16 | 0.1 |
| 7 | 52.9 | 53.6 | 40.2 | 9 | 5 | 8 | 10.2 | 9.0 | 5.2 | 8.2 | 10.4 | 8.96 | 5.23 | 8.25 | 0.1 |
| 8 | 87.9 | 9.68 | 9.14 | 9 | 8 | 4 | 7.8 | 9.0 | 8.0 | 3.5 | 0.6 | 9.00 | 8.03 | 3.52 | 0.4 |
| 9 | 91.3 | 4.84 | 9.8 | 9 | 8 | 3 | 6.5 | 8.8 | 8.3 | 3.5 | 1.0 | 8.79 | 8.30 | 3.46 | 0.1 |
| 10 | 87.8 | 8.29 | 11.8 | 9 | 8 | 4 | 7.3 | 8.9 | 8.0 | 3.5 | 0.9 | 8.94 | 8.03 | 3.51 | 0.0 |

Inviting-uninviting:
For a single color, the model used for determining a color emotion human psychophysical perception score on the "Inviting-uninviting" scale is:

$$\text{Inviting} = -1.6 + 0.009\left[(L^*-13)^2 + \left(\frac{a^*-3}{0.19}\right)^2 + \left(\frac{b^*-19}{0.29}\right)^2\right]^{\frac{1}{2}} + 0.015L^* \quad \text{Equation (11)}$$

where L*, a* and b* represent the three CIELAB coordinates for the color considered.

Clean-dirty:
For a single color, the model used for determining a color emotion human psychophysical perception score on the "clean-dirty" scale is:

$$\text{Clean} = -1.8 + 0.043\left[(L^*-28)^2 + \left(\frac{a^*-3}{1.18}\right)^2 + \left(\frac{b^*-27}{1.27}\right)^2\right]^{\frac{1}{2}} \quad \text{Equation (12)}$$

where L*, a* and b* represent the three CIELAB coordinates for the color considered.

Happy-depressing: For a single color, the model used for determining a color emotion human psychophysical perception score on the "happy-depressing" scale is:

$$\text{Happy} = -1.3 + 0.025\left[(L^*-14)^2 + \left(\frac{a^*}{0.73}\right)^2 + \left(\frac{b^*-12}{0.85}\right)^2\right]^{\frac{1}{2}} \quad \text{Equation (13)}$$

where L*, a* and b* represent the three CIELAB coordinates for the color considered.

Fun-serious:
For a single color, the model used for determining a color emotion human psychophysical perception score on the "Fun-Serious" scale is:

$$\text{Fun} = -1.8 + 0.027\left[(L^*-10)^2 + \left(\frac{a^*}{0.45}\right)^2 + \left(\frac{b^*-10}{0.61}\right)^2\right]^{\frac{1}{2}} \quad \text{Equation (14)}$$

where L*, a* and b* represent the three CIELAB coordinates for the color considered.

The real numbers produced by each of these equations can be rounded and scaled to provide an integer value on a 1-9 scale for incorporation into color emotion notations similar to the WLE color emotion notation described above.

Accordingly, example embodiments of a color emotion notation system are described herein in which quantitative models based on visual assessments by a plurality of test subjects are used to calculate values that are indicative of human emotional responses to a color. The values can be presented with the color to convey color emotion information to a person who is viewing the color.

The color emotion equations set out above have been developed based on the assumption that the CIELAB colormetric data for a subject color is measured under CIE illuminant D65. If a color is measured under an illuminant other than D65, the colormetric data can be transformed to illuminant D65 using a chromatic adaptation model (e.g. CAT02) and then the transformed data used in the above color emotion equations. Using such a transformation, the WLE notation for a color under different illuminants can be calculated. In at least some example embodiments the color notation includes information that identifies the illuminant associated with the WLE notation—for example the characters "D65" can be provided on the color sample following the WLE notation to indicate that the WLE notation is determined based on the color being under CIE illuminant D65. In some example embodiments, multiple WLE values, each associated with a different illuminant, can be presented on a color sample. In at least some example embodiments, the color defining color attribute data used in the color emotion equations identified above may take a form other than CIELAB data, including for example XYZ data (under either D65, A, F2, TL 84 or other predefined light source) or reflectance data (R %). In such cases, the different color data format can either be converted to CIELAB format and then used in the above equations, or alternatively the equations modified for the different format.

A number of different features have been described above in respect of various example embodiments. It will be appreciated that a number of the features can be applied across all of the example embodiments even if not expressly stated above. The above-described embodiments of the present application are intended to be examples only. Alterations, modifications and variations may be effected to the particular embodiments by those skilled in the art without departing from the scope of the application, which is defined by the claims appended hereto.

The invention claimed is:

1. A method of notating and displaying a color, comprising:
determining, using predetermined mathematical equations and in dependence on numerical color attributes that define a color, a plurality of numerical color emotion values each representative of a different human emotional response to the color;
transforming said plurality of numerical color emotion values to second numerical color emotion values on a scale, wherein a lower value of the scale is one (1) and an upper value of the scale is divisible by nine (9);
assigning an identifying notation to the color, the identifying notation comprising a color emotion notation that includes the second numerical color emotion values; and
presenting an image on a display device that includes the color and the identifying notation.

2. The method of claim 1 wherein the second color emotion values included in the color emotion notation are each integer values indicating a relative value on a respective color emotion scale.

3. The method of claim 2 wherein each color emotion scale is based on a respective emotional pairing having a highest degree of contrasting emotions represented at opposite ends thereof.

4. The method of claim 3 wherein at least one of the emotion pairings is selected from the group the consisting of (a) cool-warm, (b) dark-light, (c) calming-exciting, (d) inviting-uninviting; (e) clean-dirty; (f) happy-depressing; and (g) fun-serious.

5. The method of claim 2 wherein the identifying notation includes a further unique identifier for the color.

6. The method of claim 2 comprising: producing a color sample that shows the color and the identifying notation.

7. The method of claim 6 wherein producing the color sample includes applying the color and the identifying notation to a physical substrate.

8. The method of claim 6 wherein producing the color sample includes presenting an image on said display device that includes the color and the identifying notation, wherein said display device comprises an electronic display.

9. The method of claim 1 wherein the numerical color attributes include CIELAB attributes.

10. The method of claim 1 wherein the color emotion notation represents the color emotion values associated with the color viewed under a predetermined illuminant.

11. The method of claim 1 further comprising estimating the numerical color attributes for the color in dependence on the color emotion values included in the color emotion notation assigned to the color.

12. The method of claim 1 comprising:
determining color emotion notations for multiple colors, the color emotion notation for each color including a plurality of color emotion values each being representative of a respective human emotional response to the color; and
displaying on said display device a plurality of the colors organized in dependence on the relative color emotion notations for the plurality of colors.

13. The method of claim 12 wherein the displayed colors are organized so that adjacent colors have color emotion notations that are identical except for one color emotion value.

14. The method of claim 1 wherein the color emotion values included in the color emotion notation are single digits.

15. The method of claim 1 wherein at least some of the color emotion values included in the color emotion notation include multiple digits.

16. The method of claim 10, wherein the step of presenting the image includes presenting the color under a plurality of illuminants.

17. The method of claim 1, wherein the display device comprises an electronic display.

18. A method of notating and displaying a color, comprising:
determining using predetermined mathematical equations and in dependence on numerical color attributes that define a color, a plurality of numerical color emotion values each representative of a different human emotional response to the color;
assigning an identifying notation to the color, the identifying notation comprising a color emotion notation that includes the color emotion values;
for each of a plurality of suppliers, assigning color emotion notations to colors available for products from the supplier; and
displaying the colors available for products from the suppliers on a display device with the respective color notation values for the colors, thereby facilitating consistent color decisions across products offered by different suppliers.

19. The method of claim 18 wherein the products include one or more of paints, stains, architectural coatings, textiles, flooring, broadloom, drapes, appliances, furniture, countertops, clothing and cars.

20. The method of claim 18 comprising tracking the color emotion notations of the colors applied to the products sold over time and determining color trends in dependence on the tracked color emotion notations.

21. A color sample comprising:
a substrate having a display surface with a color and an identifying notation for the color being viewable on the display surface, the identifying notation including a color emotion notation that includes a plurality of color emotion values, wherein the color emotion values are on a scale, wherein a lower value of the scale is one (1) and an upper value of the scale is divisible by nine (9) and wherein each of the color emotion values is representative of a different human emotional response to the color and derived from a different predetermined mathematical equation in dependence on numerical color attributes that define the color.

22. The color sample of claim 21 wherein the color emotion values included in the color emotion notation are each integer values indicating a relative value on a respective color emotion scale, and the predetermined mathematical equations have each been derived from emotional response data collected from a plurality of test subjects in response to a plurality of color samples.

23. The color sample of claim 21 wherein the substrate display surface includes a plurality of different colors applied thereto and each having an identifying notation including a respective color emotion notation including a plurality of color emotion values for the color that are each representative of different human emotional responses to the color and derived from the different predetermined mathematical equations in dependence on numerical color attributes that define the color.

24. The color sample of claim 21 wherein the substrate comprises wall paper, fabric, flooring material, wall tile, ceiling tile, plastic, metal, composite material, paper or cardboard.

25. The color sample of claim 21 wherein the identifying notation also includes a unique identifying number for the color, and a name of the color is also viewable on the display surface.

26. A computer implemented method of presenting color samples, comprising:
receiving an input through an input device requesting that at least one color be displayed; and
displaying on a display device a visual representation of the color and an identifying notation for the color, wherein the identifying notation including a color emotion notation that includes a plurality of color emotion values, wherein the color emotion values are on a scale, wherein a lower value of the scale is one (1) and an upper value of the scale is divisible by nine (9) and wherein each of the color emotion values is representative of a different human emotional response to the color and derived from a different predetermined mathematical equation in dependence on numerical color attributes that define the color.

27. The method of claim 26 wherein displaying on the display device includes displaying a plurality of different colors, each having an identifying notation including a respective color emotion notation including a plurality of color emotion values for the color that are each representative of different human emotional responses to the color and derived from the different predetermined mathematical equations in dependence on numerical color attributes that identify the color.

* * * * *